(12) United States Patent
Gaertner et al.

(10) Patent No.: US 9,164,837 B2
(45) Date of Patent: Oct. 20, 2015

(54) TRANSFER UNIT MANAGEMENT

(71) Applicant: Seagate Technology LLC, Cupertino, CA (US)

(72) Inventors: Mark Allen Gaertner, Vadnais Heights, MN (US); Bruce Douglas Buch, Westborough, MA (US); Ryan James Goss, Prior Lake, MN (US)

(73) Assignee: Seagate Technology LLC, Cupertino, CA (US)

( * ) Notice: Subject to any disclaimer, the term of this patent is extended or adjusted under 35 U.S.C. 154(b) by 106 days.

(21) Appl. No.: 14/025,277

(22) Filed: Sep. 12, 2013

(65) Prior Publication Data

US 2015/0074486 A1 Mar. 12, 2015

(51) Int. Cl.
*G06F 11/10* (2006.01)
*G06F 12/02* (2006.01)

(52) U.S. Cl.
CPC ........ *G06F 11/1068* (2013.01); *G06F 12/0246* (2013.01); *G06F 2212/7203* (2013.01)

(58) Field of Classification Search
CPC ............... G11C 16/26; G11C 16/3454; G11C 11/5642; G11C 29/42; G06F 11/1068; G06F 12/0246; H03M 13/05; H03M 13/09; H03M 13/1515; H03M 13/152; H03M 13/19; H04L 43/50

USPC ............ 714/758, 763, 773, E11.03, E11.034, 714/718, 48, 6.1; 365/185.33, 230.03; 711/E12.001, 154

See application file for complete search history.

(56) References Cited

U.S. PATENT DOCUMENTS

| 5,799,150 | A * | 8/1998 | Hamilton et al. ............. 709/203 |
| 7,728,745 | B2 | 6/2010 | Shigenobu et al. |
| 8,325,070 | B2 | 12/2012 | Sasaki |
| 8,751,900 | B2 * | 6/2014 | Kim et al. ...................... 714/763 |
| 8,856,611 | B2 * | 10/2014 | Wu et al. ........................ 714/758 |
| 2010/0010995 | A1 | 1/2010 | Fablet et al. |
| 2010/0332909 | A1 * | 12/2010 | Larson ............................ 714/40 |
| 2011/0302475 | A1 * | 12/2011 | Eisenhuth et al. ............. 714/763 |
| 2011/0302477 | A1 * | 12/2011 | Goss et al. ..................... 714/773 |
| 2013/0297986 | A1 * | 11/2013 | Cohen ........................... 714/763 |

* cited by examiner

*Primary Examiner* — Phung M Chung
(74) *Attorney, Agent, or Firm* — Hall Estill Attorneys at Law

(57) ABSTRACT

Method and apparatus for managing data in a memory, such as a flash memory. In accordance with some embodiments, a non-volatile memory is arranged into a plurality of blocks, with each of the blocks constituting an integral plural number N of fixed-sized, multi-bit transfer units. A processing circuit retrieves at least a portion of the data stored in a selected block to a volatile memory buffer in response to a transfer unit (TU) bit map. The TU bit map is stored in a memory and provides a multi-bit sequence of bits corresponding to the N transfer units of the selected block. The values of the bits in the multi-bit sequence of bits indicate whether the corresponding transfer units are to be retrieved.

20 Claims, 6 Drawing Sheets

TU BIT MAP ←—180

| PLANE 0 PAGE 1 | PLANE 1 PAGE 1 |
|---|---|
| 0 0 0 0 0 1 1 1 | 1 1 1 0 0 0 0 0 |

→ ASCENDING ADDRESS

FIG. 10

TUA BIT MAP (INITIAL STATE) ←—190

|  | PLANE | | | |
|---|---|---|---|---|
| DIE | 0 | 1 | 2 | 3 |
| 0 | 00h | 00h | 00h | 00h |
| 1 | 00h | 00h | 00h | 00h |
| 2 | 00h | 00h | 00h | 00h |
| 3 | 00h | 00h | 00h | 00h |

FIG. 11A

TUA BIT MAP (DIE 0, PLANE 0, TRANFER UNIT 6 AVAILABLE IN FME BUFFER) ←—190

|  | PLANE | | | |
|---|---|---|---|---|
| DIE | 0 | 1 | 2 | 3 |
| 0 | 20h | 00h | 00h | 00h |
| 1 | 00h | 00h | 00h | 00h |
| 2 | 00h | 00h | 00h | 00h |
| 3 | 00h | 00h | 00h | 00h |

FIG. 11B

TUA BIT MAP (D0/PL0/TU 6-7 AVAILABLE) ← 190

| DIE \ PLANE | 0 | 1 | 2 | 3 |
|---|---|---|---|---|
| 0 | 60h | 00h | 00h | 00h |
| 1 | 00h | 00h | 00h | 00h |
| 2 | 00h | 00h | 00h | 00h |
| 3 | 00h | 00h | 00h | 00h |

FIG. 11C

TUA BIT MAP (D0/PL1/TU 1, D3/PL1/TU 8, D3/PL2/TU 1-5 AVAILABLE) ← 190

| DIE \ PLANE | 0 | 1 | 2 | 3 |
|---|---|---|---|---|
| 0 | 00h | 01h | 00h | 00h |
| 1 | 00h | 00h | 00h | 00h |
| 2 | 00h | 00h | 00h | 00h |
| 3 | 00h | 80h | 1Fh | 00h |

FIG. 11D

TRANSFER UNIT MANAGEMENT

SUMMARY

Various embodiments of the present disclosure are generally directed to the management of data in a memory, such as but not limited to a flash memory.

In accordance with some embodiments, a non-volatile memory is arranged into a plurality of blocks, with each of the blocks constituting an integral plural number N of fixed-sized, multi-bit transfer units. A processing circuit retrieves at least a portion of the data stored in a selected block to a volatile memory buffer in response to a transfer unit (TU) bit map. The TU bit map is stored in a memory and provides a multi-bit sequence of bits corresponding to the N transfer units of the selected block. The values of the bits indicate whether the corresponding transfer units are to be retrieved.

These and other features which may characterize various embodiments can be understood in view of the following detailed discussion and the accompanying drawings.

BRIEF DESCRIPTION OF THE DRAWINGS

FIG. 10 shows an exemplary format for a transfer unit (TU) bit map in accordance with some embodiments.

FIGS. 11A-11D show exemplary formats for a transfer unit available (TUA) bit map in accordance with some embodiments.

DETAILED DESCRIPTION

Figure 1:
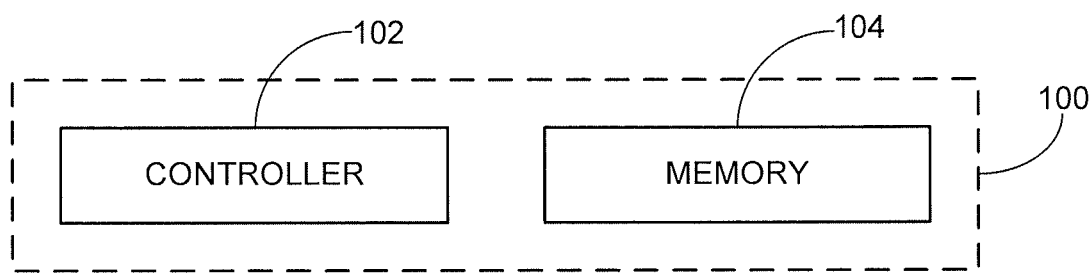
FIG. 1 provides a functional block representation of a data storage device in accordance with various embodiments.

The present disclosure generally relates to managing data stored in a memory module, such as but not limited to a flash memory of a data storage device.

A wide variety of data storage memories are known in the art. Some memories are formed from solid-state memory cells which store data in relation to an amount of accumulated charge on a floating gate structure, such as with flash memory. An erasure operation is generally required before new data can be written to a given flash memory location.

Data can be written to a flash memory in the form of pages, which represent a fixed amount of data such as 8192 bytes (B). Usually, an entire page's worth of data is written at a time. The flash memory cells may be configured as single-level cells (SLCs) so that each cell stores a single bit (e.g., a logical 0 or 1), or as multi-level cells (MLCs) so that each cell stores multiple bits (two bits or more). MLCs store different data page across the same group (e.g., row) of cells.

Some flash memory modules are arranged to allow the storage of a fixed amount of user data (the "payload") along a selected row of cells, and additional memory cells along the row are dedicated to the storage of parity data, such as error correction codes (ECC), to correct errors in the payload data. Other arrangements allow the storage of either payload or parity data to the cells along each row.

Factors such as data compression, different ECC code levels, block header information, etc. can alter the overall data footprint for a given data block. Some data management schemes write non-standard sized data blocks to the memory and wrap portions of blocks to adjacent pages, or use filler bits, to ensure one or more complete pages of data are written during each write operation. While operable, this can increase the complexity of the data management scheme since metadata control information is required to track the locations of each block in terms of array, die, plane, erasure block, page, bit offset location, etc.

Accordingly, various embodiments are generally directed to a novel data management scheme for a solid state memory, such as but not limited to a flash memory. As explained below, in some embodiments data are written to the memory in the form of fixed-sized code words (CWs), each having a user data payload portion and a parity (ECC) data portion. The relative amount of payload data in a code word is not fixed, but instead is adjusted to accommodate higher or lower ECC footprints to better match then-existing error rate performance of the memory, which tends to degrade over the operational life of the memory.

The code words are grouped into fixed-sized transfer units (TU), which constitute some integral fraction of a page of memory, such as ⅛, 1/16, etc. During a read operation, a transfer unit (TU) bit map is generated to identify which transfer unit(s) is/are being requested along a given page. The requested transfer units are retrieved to a local buffer. A transfer unit available (TUA) bit map is generated to provide a global indication of transfer units that have been retrieved to the buffer and which are available for retrieval to a host buffer for transfer to a requesting host. The TUA bit map is used to select which data are to be retrieved from the local buffer to a host buffer for subsequent transfer to a host device.

These and other features of various embodiments can be understood beginning with a review of FIG. 1 which provides a simplified block diagram of a data storage device 100. The data storage device 100 includes two main modules: a controller 102 and a memory module 104. The controller 102 may be a hardware-based or programmable processor with associated memory. The memory module 104 may take a variety of forms and generally constitutes a solid-state non-volatile memory with associated control electronics.

For purposes of providing a concrete example, the device 100 will be contemplated as comprising a solid state drive (SSD) and the memory module 104 will comprise a flash memory device. Other configurations can be used, including configurations that incorporate the controller and memory module functions into a single integrated circuit as a system on chip, SOC.

Figure 2:
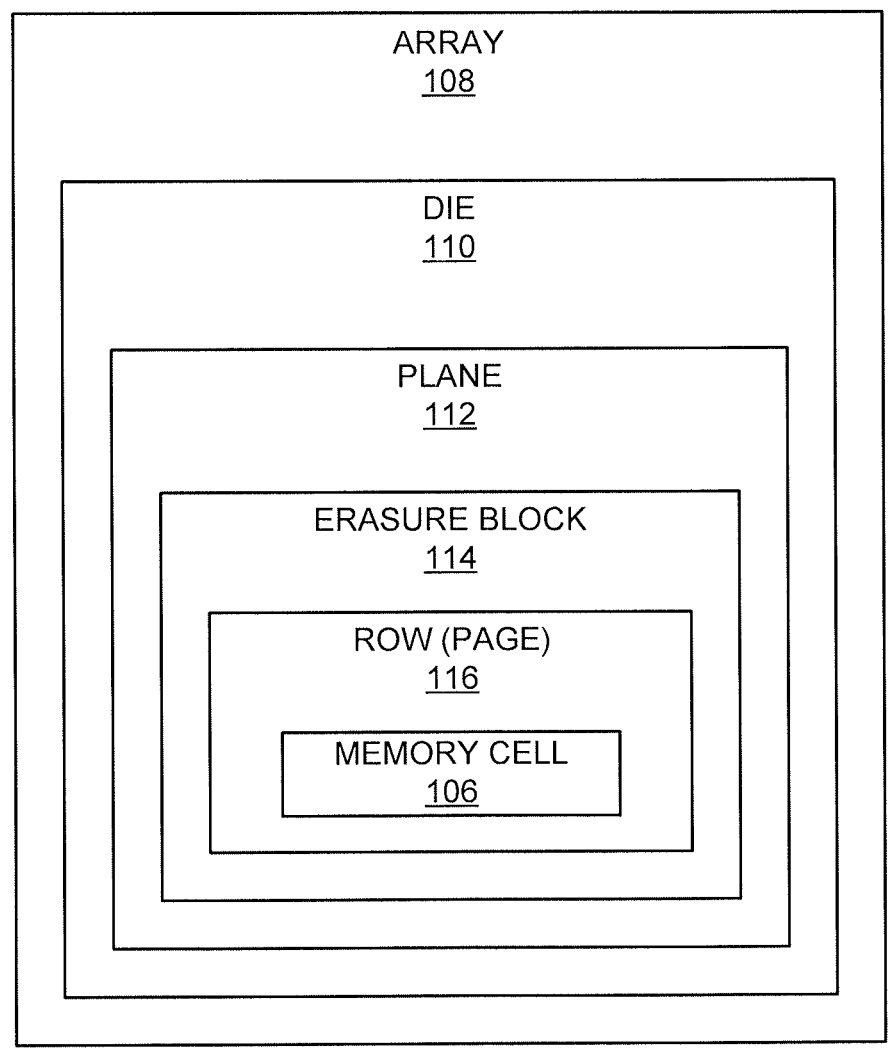
FIG. 2 is a schematic depiction of the memory module of FIG. 1 as a flash memory in accordance with some embodiments.

The flash memory of the memory module 104 is formed from a population of flash memory cells 106 that are arranged as shown in FIG. 2. The memory module 104 includes one or more arrays 108 of memory cells. Each array 108 incorporates one or more dies 110, which are physically distinct semiconductor wafers or chips. Each die 110 includes a number of planes 112, with each plane having the capability of executing a corresponding access (e.g., program, read, erase) operation. An example configuration is four planes per die and four dies per array, which would support up to 16 concurrent access operations (one per plane). Other arrangements can be used.

Each plane 112 groups the memory cells 106 into erasure blocks 114, which represent the smallest grouping of cells that can be concurrently subjected to an erasure operation. Each erasure block 114 is formed of a plurality of rows (pages) 116 of memory cells 106.

Figure 3:
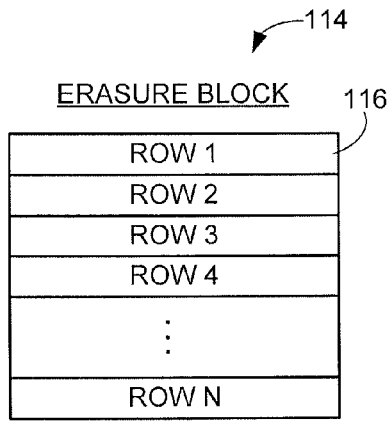
FIG. 3 illustrates an exemplary format for an erasure block of the flash memory.

FIG. 3 illustrates an example erasure block 114 with N rows 116. An example configuration for the erasure block 114 is a row count of 128 (N=128), with each row having 65,536 cells to provide a per-page data capacity size of 8192B (65,536/8=8192). Other numbers and lengths of rows can be used.

Figure 4:
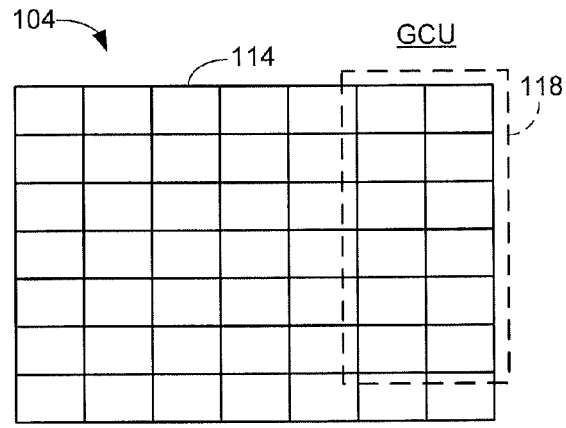
FIG. 4 illustrates a number of erasure blocks arranged into garbage collection units (GCUs).

FIG. 4 shows erasure blocks 114 arranged into garbage collection units (GCUs) 118 which are allocated and erased as a unit. The GCUs may extend across multiple planes. The GCUs 118 are managed using garbage collection operations. After a set of data has been written to a group of flash memory cells 106, the group of cells generally requires an erasure operation to reset the cells before new data can be written thereto. If data associated with a particular logical address, such as a logical block address (LBA), are written to the flash memory 104, and an updated version of the same data are subsequently presented for storage to the memory, the new data (LBA) will be written to a new location and the older version of the data will be marked as stale.

Once a sufficient amount of data in a given GCU 118 are marked as stale, a garbage collection operation will be scheduled during which the data in the GCU 118 that are still at a current version level are copied to a new location, the entire GCU is subjected to an erasure operation, and the GCU is returned to an available allocation pool. Wear leveling techniques may be carried out in an effort to maintain all of the GCUs 118 in the memory 104 with a substantially similar number of program/erase (PE) cycles.

The data along each row 116 can be written using single level cells (SLCs) or multi-level cells (MLCs). SLCs store a single page of data to each row 116, and MLCs store multiple pages of data, such as two pages of data, to each row 116. Generally, $2^N$ storage stages can be used to represent N bits of data (e.g., $2^2=4$ storage states can be used to store two bits). When two bits are stored by each cell, the least significant bits (LSB) can represent bit values for a first page of data and the most significant bits (MSB) can represent bit values for a second page of data.

Figure 5:
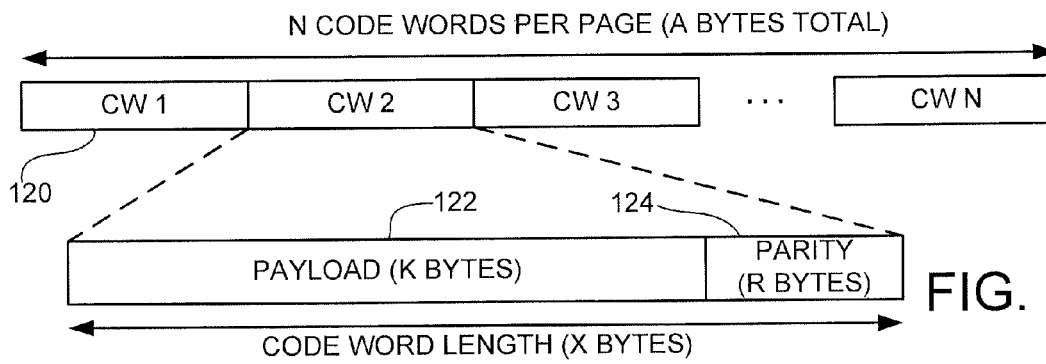
FIG. 5 shows storage of data to the erasure blocks of FIGS. 3-4 in code words formatted in accordance with some embodiments.

FIG. 5 illustrates the use of fixed-sized code words (CW) 120 to store data to each page in accordance with some embodiments. A total of N code words (CW 1 to CW N) per page is used. Each row has a row length of A bytes, and each code word has a code word length of X bytes, so that X=A/N. In one embodiment, each page constitutes 8192 bytes (A=8192B) and N equals eight (N=8), so that each code word 120 has an overall length of 1024 bytes (X=1024B). Other configurations can be used.

Each code word 120 includes a user data payload 122 (K bytes) and parity data 124 (R bytes). In the example of FIG. 5, the code word length X (X=K+R) is set to a fixed value and this value is maintained for all code words throughout the operational life of the device 100.

Figure 6:
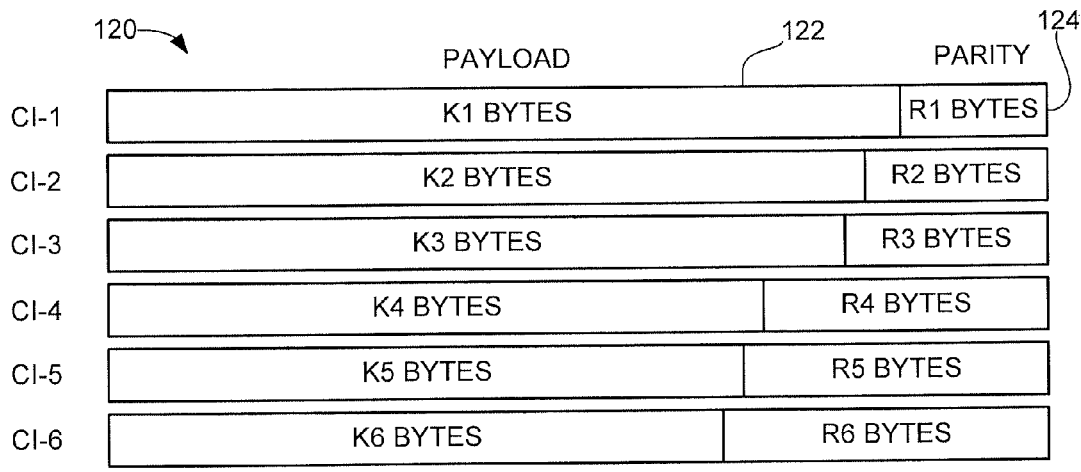
FIG. 6 illustrates different code indices for the code words in FIG. 5 having different respective amounts of parity data and user data payloads.

The relative sizes of the payload (K bytes) and parity data (R bytes) can vary. FIG. 6 depicts six (6) different code word schemes, referred to as code indices (CI-1 to CI-6). The code indices range from a low strength ECC scheme (CI-1) to a high strength ECC scheme (CI-6).

The sizes of the parity data (R bytes from FIG. 5) range from R1 to R6, and the sizes of the user data payload (K bytes from FIG. 5) range from K1 to K6. In each case, the total size of the code words remains constant at X=1024B (or some other value).

In FIG. 6, as the ECC strength increases, the footprint of the parity data increases and the footprint of the user data payload decreases. While it is contemplated that this will often be the case, higher strength ECC schemes may not necessarily always require larger ECC footprints depending on the type of ECC scheme being employed. The relative sizes of the parity and payload can vary as required.

A code rate (CR) for each of the indices in FIG. 6 can be defined as:

$$CR = \frac{K}{K+R}(100\%) \quad (1)$$

Over time, K will decrease as R increases, and the code rate CR will be reduced. For code words of 1024B, illustrative K and R values may be K1=976B and R1=48B for CI-1, K6=912B and R6=112B for CI-6, etc. The parity data can take a variety of forms such as BCH codes, Reed Solomon ECC codes, LDPC codes, checksums, outercode, etc. Multiple levels of ECC can be used to increase the parity data footprint. External ECC can be employed as required to provide further correction capabilities.

The payload boundaries vary and may not be aligned with logical address boundaries in the input data from the host device (e.g., LBA sizes of 4096B, etc.). A data recovery operation for a selected set of LBAs involves the readback of the code words 120 having payload data corresponding to the LBAs, followed by the application of the parity data to detect and/or correct bit errors and the assembly of the recovered data into the original LBA data sets for transfer to the requesting host device.

Figure 7:
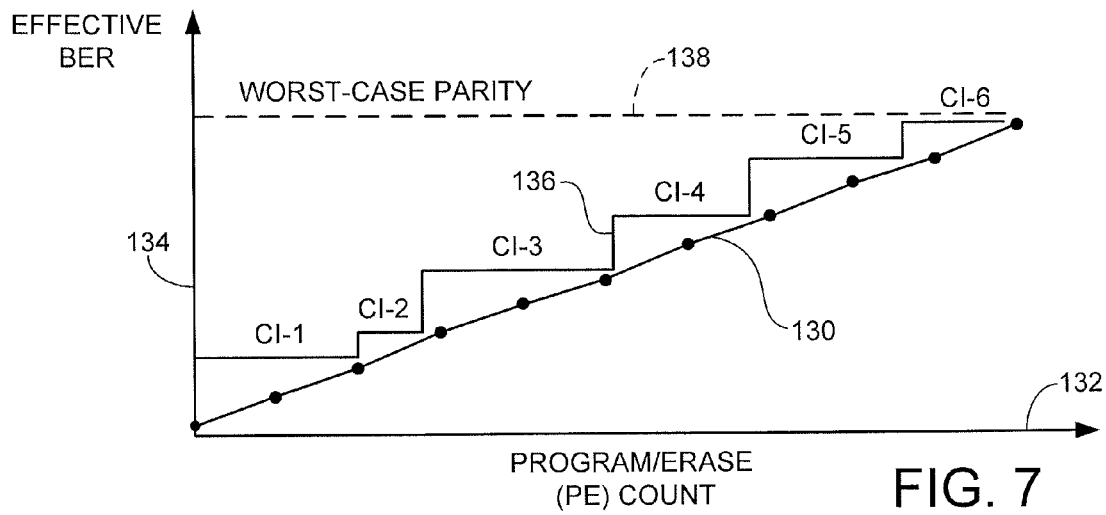
FIG. 7 graphically illustrates bit error rate (BER) and code indices over an operational life of the device of FIG. 1.

FIG. 7 is a graphical representation of a bit error rate (BER) curve 130, plotted against a program/erase (PE) count x-axis 132 and an effective BER y-axis 134. The PE count generally represents an accumulated count of PE operations upon a selected memory location (e.g., a row 114, FIG. 3) of the flash memory module 104. The memory module 104 may have a specified life, such as around 35,000 PE operations, and the curve in FIG. 7 may extend to this level or may extend beyond it. The effective BER indicates the BER rate with the application of the parity data to the user data payloads.

The curve 130 is shown to be substantially linear, although other shapes may be encountered. The curve 130 can be generated by monitoring, over time, the effective BER of the flash memory device by location.

FIG. 7 further shows a code index (CI) curve 136 having a step-function shape. Each plateau represents a different code index from FIG. 6. This is merely illustrative as not all available code indices necessarily need be used, nor do they need to necessarily be used in the depicted order. Further, in yet some other embodiments, additional code indices may be employed in order to provide a higher code rate for a given PE count. For purposes of comparison, a worst-case parity level is depicted by broken line 138. The worst-case parity level generally represents an alternative parity level selected based on the BER performance expected to be encountered as the device reaches the end of its operational life. In an alternative embodiment, this worst-case ECC strength can be implemented during the entirety of the device operational life.

As can be seen from curve 136, though, different code indices are utilized over the operational life of the device 100. Initially, CI-1 is used so that data are stored in code words having (for example) 48B of parity data and 976B of payload data. The parity data may be a low strength ECC scheme such as a BCH code. This continues until an increase in the observed effective BER warrants a stepwise increase in ECC strength, as denoted by the switch to CI-2, which may use a relatively stronger LDPC code, and so on. Any suitable CI profile can be used.

It will be appreciated that the distance between the step-function CI curve 136 and the substantially linear BER curve 130 at any point represents the overprovisioning of error correction capability by the system at that point. Reducing this distance to a minimum will tend to improve performance by providing error correction capabilities suitable for the then-existing BER performance of the system. This will also increase the then-available amount of memory for the storage of user data. By contrast, the significant distance between the worst-case line 138 and the curve 130 shows that, for most of the operational life of the device, using a worst-case ECC scheme can be wasteful and unnecessary.

Nevertheless, it will be appreciated that the use of code words with embedded parity data is not necessarily required. In other embodiments, the flash memory module may be arranged to include both a user data portion along each row 114, such as 8192B of user payload data, and an additional ECC portion along the row, such as 1024B, to store parity (ECC) data to correct errors in the user data payload. In such case, ECC data can be generated and stored in the ECC portion, and the code words can be formed to only include user data payloads. In this latter case, eight (8) code words of 1024B of payload data can be used for each page of 8192B of data (e.g., X=K=1024B and R=0). The ECC can be a worst case parity level (e.g., line 138 in FIG. 7) or can be adjusted over the life of the device, including the use of additional outercode to accommodate changes in BER.

Figures 8A, 8B, 8C:
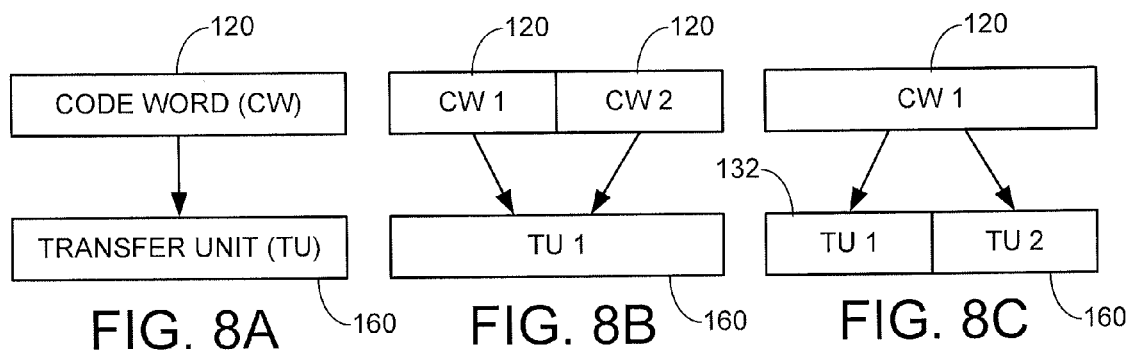
FIGS. 8A-8C show different arrangements of the code words (CWs) into transfer units (TUs).

FIGS. 8A-8C illustrate the use of transfer units (TUs) 160 to manage the transfer of data to and from the memory 104 in accordance with various embodiments set forth by the present disclosure. Generally, each transfer unit (TU) 160 is a fixed-sized set of data. Each TU 160 can be the same size as, and correspond to, an associated code word (CW) 120 as represented in FIG. 8A. That is, in FIG. 8A, a page storing eight code words will also store eight transfer units so that each code word is treated as a separate transfer unit.

Multiple code words can be incorporated into a single transfer unit, as represented in FIG. 8B which shows two code words CW 1 and CW 2 incorporated into a single transfer unit TU 1. In one example, a page may store 16 code words and eight transfer units. Other integral plural numbers of code words can be incorporated into each transfer unit, such as four, eight, etc.

A single code word can be divided into multiple transfer units, as shown in FIG. 8C. In FIG. 8C, a single code word CW 1 is equally spread across two transfer units TU 1 and TU 2. In general, any number of transfer units 160 can correspond to any number of code words 120, and vice versa. Code word and transfer unit boundaries should generally align, but such is not strictly required. It is contemplated that the same ratio of code words to transfer units will be used throughout each array 108, although such is not necessarily limiting; some sections of memory (e.g., a first set of GCUs) may use a first code word and/or transfer unit arrangement, other sections of memory (e.g., a second set of GCUs) may use a different, second code word and/or transfer unit arrangement, and so on.

Figure 9:
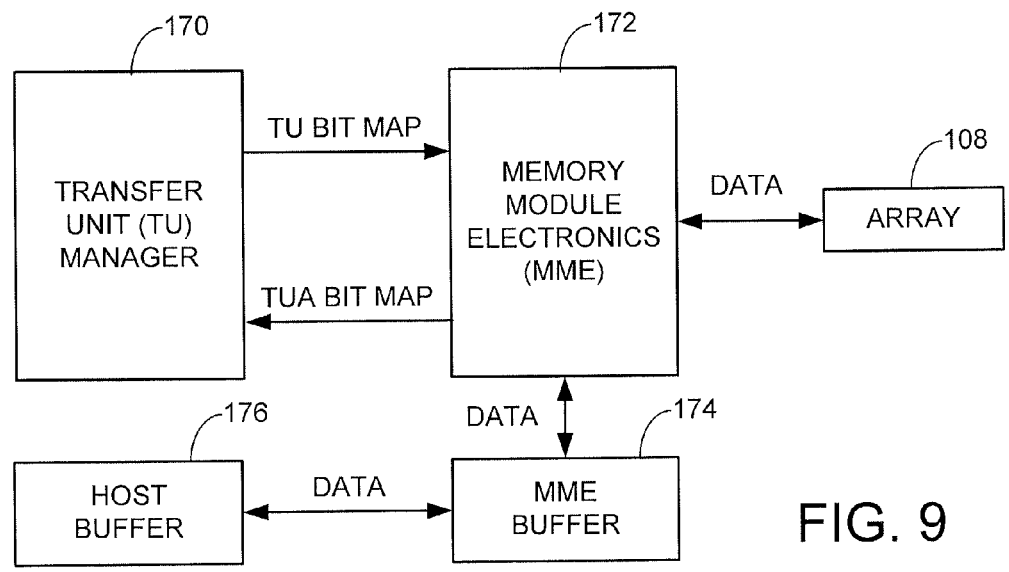
FIG. 9 shows a transfer unit (TU) manager operative in accordance with some embodiments.

FIG. 9 is a functional block representation of relevant portions of the storage device 100 of FIG. 1 in accordance with some embodiments. FIG. 9 shows a transfer unit (TU) manager circuit 170 which communicates with a memory module electronics (MME) circuit 172. While not limiting, it is contemplated that the TU manager 170 is incorporated as a portion of the operational functionality of the top level controller 102. The MME 172 represents read/write/erase (R/W/E) circuitry and other control circuitry incorporated into the flash memory module 104. The MME 172 can have a relatively small, local MME data buffer 174. A relatively large host buffer 176 associated with the controller 102 can buffer data pending transfers with a host device. In some cases, the MME 172 may be characterized as a flash memory electronics (FME) module.

While not limiting, it will be recognized by those skilled in the art that current generation SSDs and other data storage device systems can be formed from integrated memory modules such as 104 that are commercially available from a source of such devices. The memory modules are integrated into an SSD by a device manufacturer which supplies the controller functions such as 102 and tailors the controller to operate with the memory module. The controller and memory module are thus separate operational entities which communicate across one or more defined data and command interfaces. A "pull" system is commonly used in which the controller issues commands and then repetitively checks the status of those commands by the memory module to determine whether the commands have been completed.

Using this scheme, when reading data from the memory 104 the controller 102 can issue a read command with a format that identifies the requested data to be returned from the memory 104 to the controller 102 for subsequent transfer to an external host device coupled to the SSD 100. The MME 172 schedules and executes the read command and places the retrieved data into the local MME buffer 174. The controller 102 subsequently issues one or more status commands, such as read status enhanced (RSE) commands, which request a status associated with the retrieved data. If the memory module has completed the data read operation, the MME signals a "ready to transfer" status, after which the controller 102 executes a request for transfer of the data from the MME buffer 174 to the host buffer 176, and the data are pulled from the local buffer to the host buffer for subsequent host transfer.

The TU manager 170 of FIG. 9 improves the efficiency of the data and command exchanges between the controller and the memory module. As represented in FIG. 9, the TU manager 170 generates and transmits a transfer unit (TU) bit map to the MME 172 at appropriate times, such as during the servicing of read commands. The TU bit map provides an efficient mechanism for identifying requested transfer units 160 (FIGS. 8A-8C) from the array 108 (FIG. 9).

Once the data are retrieved and placed into the MME buffer 174, the MME 172 updates a transfer unit available (TUA) bit map, which provides a global map of pending readback data (TUs) in the MME buffer 174 that are available for transfer to a selected portion of the memory (such as a particular set of die and plane combinations; see FIG. 2). The TU manager 170 obtains a copy of the TUA bit map from the MME 172, such as in response to an RSE command, and uses the TUA bit map to determine which data to pull from the MME buffer 174 to the host buffer 176. As data are cleared from the MME buffer 174, the MME 172 resets the corresponding entries in the TUA bit map.

FIG. 10 shows an example format for a TU bit map 180 in accordance with some embodiments. The bit map is 16 bits in length and corresponds to two pages of data, one located on a first plane (plane 0) and one located on a second plane (plane 1). Both pages otherwise share common GCU, erasure block and page addresses. Other arrangements can be used, including TU bit maps that are limited to a single page or TU bit maps that extend over more than two pages.

Each bit in the TU bit map corresponds to a transfer unit 160 in the associated page. In FIG. 10, each of the respective pages has a total of eight transfer units (TUs). A logical "1" in the bit map indicates a request for the associated TU, and a logical "0" indicates that the associated TU is not being requested. Physical addresses (e.g., TU block addresses) ascend from TU 1 to TU 8 in the first page, followed by TU1 to TU 8 in the second page. Other conventions can be used. For example, the transfer units (TU) may be identified using 0 as the first value, such as TU 0-7, but the present discussion will use the convention TU 1-8 for ease of explanation.

The example TU bit map 180 in FIG. 10 provides a 16-bit value (0000011111111000) that indicates a read request for the sixth, seventh and eighth transfer units (TU 6-8) in the first page and the first, second and third transfer units (TU 1-3) in the second page. The requested transfer units need not be consecutive, nor is it necessary to request transfer units from more than one page. Alternative TU bit maps may (for example) include bit values of (0000000010000000), (0101010101010101), etc.

Other sizes and lengths of TU bit maps can be provided. For example, a system that employs 16 transfer units per page could have 16 bits per page in the TU bit map. Any number of consecutive pages can be incorporated into the TU bit map. For example, a four page bit map with eight TUs per page would be 32 bits in length, and so on. While the various embodiments disclosed herein use a one-to-one correspondence between bits and TUs 160, such is not necessarily required as other arrangements can be used including multiple bits per TU, additional bits to provide status information, etc.

FIGS. 11A-11D show various examples of a TUA bit map 190 generated by the MME 172 of FIG. 9. The TUA bit map 190 provides bit values for a four-plane, four-dies-per-plane arrangement. Other formats for the TUA bit map can be used. In FIG. 11A, the TUA bit map is in an initialized state, so that all field values are set to zero (00h, or 00000000).

Each entry in the TUA bit map 190 corresponds to the TUs in an associated page. In the present example, there are eight TUs per plane, so each entry in the TUA bit map is an 8-bit value. Thus, the first 00h entry in the TUA bit map 190 at Die 0, Plane 0 corresponds to the status of the eight transfer units in the first half of the TU bit map 180 in FIG. 10. The second 00h entry in the TUA bit map 190 at Die 0, Plane 1 corresponds to the status of the eight transfer units in the second half of the TU bit map 180 in FIG. 10, and so on. A logical "0" bit value indicates the associated transfer unit is not in the local MME buffer 174, and a logical "1" bit value indicates the associated transfer unit is available in the local MME buffer. As before, a one-to-one correspondence between bits and TUs is contemplated but not necessarily required since other indication schemes can be implemented.

FIG. 11B shows the TUA bit map 190 with the value 20h for the entry corresponding to die 0, plane 0. The remaining entries are still set to 00h. The entry in the D0, PL0 field of 20h corresponds to the 8-bit expression (00100000), which means that the sixth transfer unit (TU 6) from the associated page has been transferred to the MME buffer and is available for retrieval by the controller 102. Any suitable ordering convention can be used to assign bits to transfer units.

FIG. 11C shows the entry for die 0, plane 0 has been updated to the value 60h. All remaining entries are still set to 00h. The value 60h corresponds to the 8-bit expression (01100000), so that now the sixth and seventh transfer units (TU 6-7) are available in the MME buffer 174. The MME 172 updates the TUA bit map each time data are recovered to the MME buffer.

FIG. 11D shows the entry for die 0, plane 0 to have been reset to 00h, which occurs after a successful transfer of the data to the host buffer 176 (FIG. 9). An acknowledgement may be submitted to the MME that the transfer was successful prior to the clearing of each TUA bit map entry.

FIG. 11D indicates that other data have been moved to the local MME buffer 174: the entry at die 0, plane 1 is set to 01h (TU 1 is available); the entry at die 3, plane 1 is set to 80h (TU 8 is available); and the entry at die 3, plane 2 is set to 1Fh (TUs 1-5 are available).

The transfer units 160 and the associated bit maps 180, 190 provide an efficient mechanism to facilitate data transfers. The TU bit map serves as a read parameter to enable the MME 172 to identify which transfer units to read from flash and decode, and the TUA bit map serves as a status parameter to indicate data are available to be fetched by the controller 102 (MME host).

In some embodiments, a TU map is provided for each plane, and the most significant bit of the TU bit map indicates the highest addressable transfer unit within the page (as depicted in FIG. 10). In an 8-bit implementation, each bit corresponds to $\frac{1}{8}^{th}$ of a decoded page (e.g., a transfer unit in this example).

The MME 172 can be configured to present transfer units available in an ascending addressable manner for each read command. The controller (MME host) 102 can also fetch data in an ascending address order. In some implementations, the MME host will begin with fetching from the lowest plane, lowest TU offset indicated in the TUA bit map. The MME host will then fetch the next highest TU from the lowest addressed plane until it has completed fetching data from the lowest addressed plane. The MME host will then continue to the next highest plane and start the lowest TU offset as indicated by the TUA bit map. This process will continue until all requested TUs have been completely fetched.

The transfer unit management scheme disclosed herein can be utilized in conjunction with a variety of MME transfer events, such as block level read commands, read enhanced status (RES) commands, NAND read data transfer commands and random data output commands.

For example, when issuing a read command, normal addressing can be used at the die, plane, GCU, erasure block and page level to identify the associated page or pages, and the TU bit map can be used to identify the associated transfer units to be transferred from the associated page(s). When issuing a read enhanced status (RES) command (e.g., a "status request"), the MME can return a status associated with the previously issued read command and the MME can update and forward the TUA bit map as the status response.

Depending on operation, the controller 102 may issue a read command and then immediately provide a succession of RSE requests on regular intervals to check the status of the read command. The MME 172 may provide a "command not yet completed" status for the associated read command identified in the RES command, or may submit a TUA bit map that shows the associated data are not yet available (e.g., an entry of 00h, etc.).

Accordingly, the TUA bit map can provide a mechanism that reduces the number of RSE commands that need to be supplied to the MME 172, since the TUA bit map provides a status in real time of all of the data in the buffer associated with multiple pending read commands. This allows the controller 102 to obtain the TUA bit map on a less frequent basis, note which data has become available since the last update, and initiate the pulling of the appropriate data.

A random data output read request can be a request for a portion of a transfer unit (e.g., 200 bytes of a selected transfer unit with some bit offset measured from the beginning of the transfer unit). This can be carried out by sending the TU bit map to identify the associated transfer unit, as well as conventional offset values to enable the MME to identify those bits that have been requested. It will be noted that using the code words 120 as discussed above will generally involve the MME recovering and decoding (applying ECC, etc.) to the entire transfer unit, and providing the same availability status in the TUA bit map. During data retrieval, however, only the requested bytes will be forwarded from the local MME buffer 174 to the host buffer 176.

A NAND data transfer generally involves sequentially streaming all, or large portions of, the memory to the host buffer. It is handled as before by issuing a random data output for all transfer units indicated by the TU bit map.

It will be appreciated that the TU bit map at the requesting level and the TUA bit map at the status level can be generated at appropriate times and maintained by different modules, as required. The transfer unit mechanism has particular suitability in a read enhanced status (RES) environment where the controller waits and repetitively checks to determine if a command is completed, but such is not necessarily required.

Figure 12:
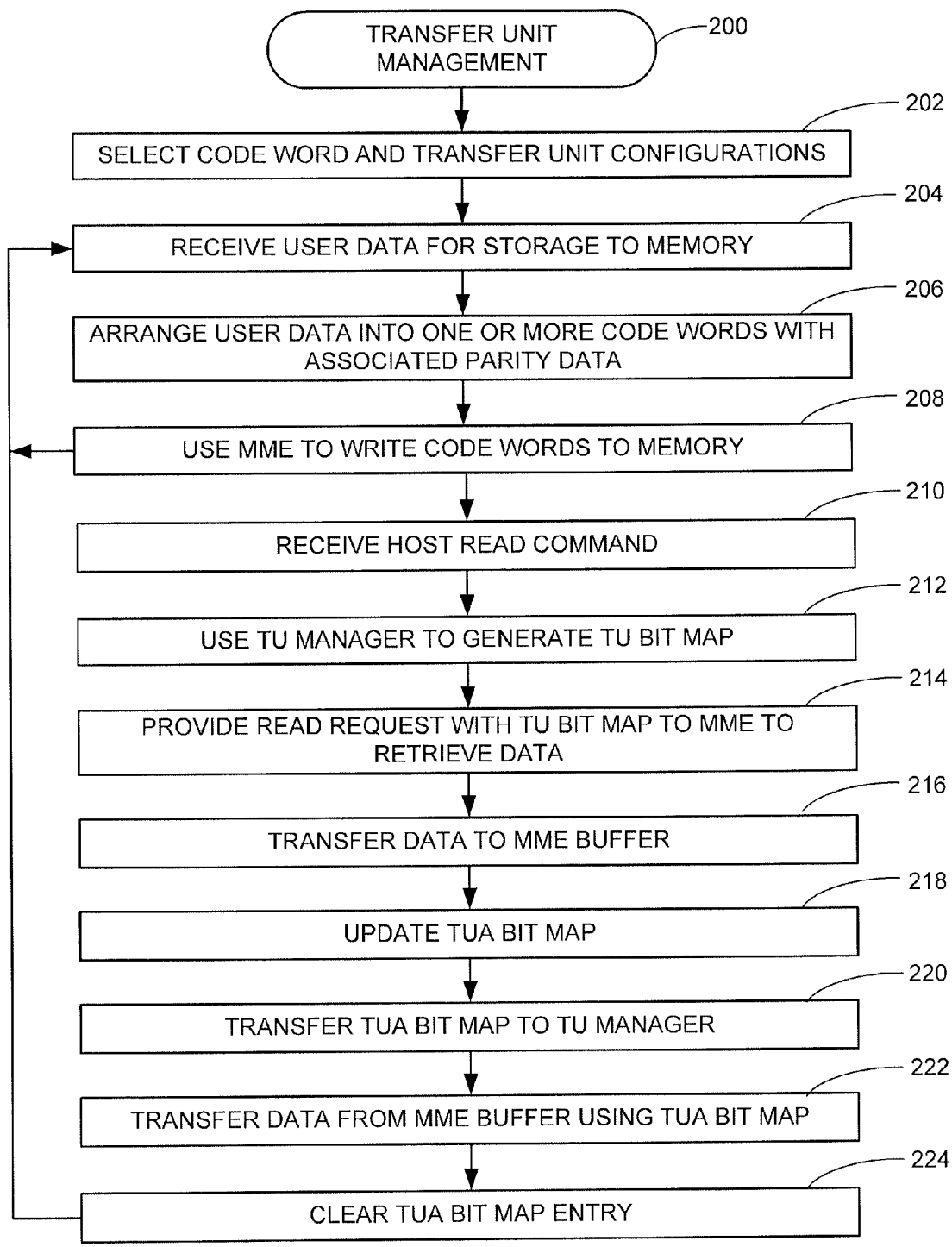
FIG. 12 is a flow chart for a TRANSFER UNIT MANAGEMENT routine illustrative of steps carried out by the device of FIG. 1 in accordance with various embodiments.

FIG. 12 is a flow chart for a TRANSFER UNIT MANAGEMENT routine 200 illustrative of steps carried out in accordance with the foregoing discussion. It will be understood that the various steps are exemplary and may be modified, performed in a different order, omitted, and new steps added, as required. For purposes of discussion, it will be contemplated that the routine is performed by the data storage device 100 of FIG. 1 using the circuitry of FIG. 9 and the data structures of FIGS. 10-11.

At step 202, a system configuration process includes selecting code word and transfer unit configurations. As noted above, the use of code words with both user data payloads and parity data promotes certain efficiencies in terms of both decoding and BER degradation compensation, but such is not necessary. In alternative embodiments, such as the case where ECC is maintained separately for each page of user data payload, each transfer unit may be defined as 1/N of a page of the payload data (e.g., ⅛, etc.).

Data for storage to the memory 104 is next received at step 204. This may be in the form of a host write command to the device 100. The write data are temporarily stored in the host buffer 176 (FIG. 9).

The user data are arranged into one or more code words with associated parity data at step 206. This step can be carried out at the controller and/or memory module level. Filler bits can be used to align user data payloads with code word boundaries. Appropriate metadata and control information can be generated as well, including logical address to physical address conversion information, identification of previously stored data sets that will become stale as a result of the write operation, etc.

The code words are next written to an appropriate location in the memory at step 208 using normal processing, with the code words aligned to transfer unit boundaries. This step can include the generation and use of the TU bit map and TUA bit map structures as required; for example, the TU bit map can signify the transfer units to which particular data have been written (or are to be written as commanded by the controller). This can aid in future reference during logical-to-physical address conversion. Similarly, a TUA style bit map can be issued by the MME to the MME host to signify actual completion of the write operations. It will be appreciated that the receipt and storage of write data will represent an ongoing process of the device during operation, as indicated by the return loop lines from block 208 to block 204.

Continuing with the routine of FIG. 12, the process continues at step 210 where a host read command is received by the device 100. This host read command may constitute a request for one or more blocks of data (e.g., LBAs, etc.). The blocks may be identified by logical addressing, which may or may not correspond to transfer unit/code word boundaries.

The TU manager 170 (FIG. 9) uses the metadata and other control information to identify the transfer units associated with the requested data, and generates one or more TU bit maps to identify the same. This is carried out at step 212. The TU manager 170 next issues a read command to the MME 172 at step 214, and a portion of the command will include the TU bit map to identify the associated transfer units that have been requested as part of the read command.

The MME 172 decodes the TU bit map and other addressing supplied as part of the read command, and proceeds at step 216 to read out the identified transfer units, apply parity (ECC) decoding and store the decoded data to the local MME buffer 174. The MME 172 further operates to update the TUA bit map to indicate the presence of the available transfer units in the buffer, as discussed above in FIGS. 11A-11D.

The TUA bit map is transferred to the TU manager 170 at step 220. This may be as a result of a status request, such as an RES, or the TUA bit map may be made available to the TU manager in some other way. The TU manager 170 uses the TUA bit map to identify the available transfer unit(s), and transfers the same to the host buffer 176 at step 222. This can be carried out using normal data transfer techniques, such as via a separate output command, a direct memory access (DMA), etc.

Once the data have been successfully retrieved, the MME 172 clears the TUA bit map entry for the requested data, and the process returns to step 204 to process further write and read operations.

In sum, various embodiments operate to arrange blocks (pages) of data into an integral number of transfer units with fixed boundaries, and to utilize a read-level bit map (TU bit map) and a status-level bit map (TUA bit map) to manage data transfers. The use of code words with user data payloads and local parity (ECC) footprints further enhances efficiency by increasing available data storage for user data and reducing ECC processing time by tailoring ECC strength to the then-existing BER performance level of the memory.

While various embodiments have been described in the environment of a flash memory, such is merely illustrative. The various embodiments can be readily implemented into other forms of solid-state memory including but not limited to spin-torque transfer random access memory (STRAM), resistive random access memory (RRAM), phase change random access memory (PCRAM), magnetic random access memory (MRAM), etc.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
   a non-volatile memory comprising a plurality of blocks each arranged into an integral plural number N of fixed-sized, multi-bit transfer units; and
   a processing circuit configured to retrieve data from a selected block to a volatile memory buffer responsive to a transfer unit (TU) bit map comprising a multi-bit sequence of N total bits each of the N total bits corresponding to a different one of the N transfer units of the selected block, each of the N total bits having a value of 0 or 1, the 0 or 1 value of each of the N total bits indicating whether the corresponding transfer unit is to be retrieved responsive to a host read command.

2. The apparatus of claim 1, wherein the multi-bit sequence of bits in the transfer unit bit map is N bits in length with each bit representing a different one of the N transfer units in the selected block, each of the N bits having one of a first logical bit value or a second logical bit value, wherein the first logical bit value signifies a request for a transfer of the data stored in the associated transfer unit to the volatile memory buffer, and the second logical bit value signifies that the data in the associated transfer unit has not been requested for transfer to the volatile memory buffer.

3. The apparatus of claim 1, wherein each of the N transfer units in the selected block comprise a user data payload and parity data configured to correct at least one read error in the user data payload during a read operation.

4. The apparatus of claim 1, wherein each of the plurality of blocks is a page of memory in a flash memory array with an overall data storage capacity of A bytes, and wherein each of the transfer units has an overall data storage capacity of X=A/N bytes.

5. The apparatus of claim 1, wherein the processing circuit comprises a flash memory electronics (MME) module which receives the transfer unit bit map in conjunction with a read command from an MME host.

6. The apparatus of claim 1, further comprising a transfer unit manager, coupled to the processing circuit, which generates the transfer unit bit map responsive to a host read command and transmits the transfer unit bit map to the processing circuit in conjunction with a read command that supplies additional address information to the processing circuit to transfer said data.

7. The apparatus of claim 6, wherein the processing circuit is further configured to generate a transfer unit available (TUA) bit map comprising a plurality of entries for a corresponding plurality of blocks in the non-volatile memory, wherein each of the entries comprises a multi-bit value corresponding to a selected one of the transfer units of the associated block, the multi-bit value of each entry comprising at least one bit having either a first logical value or a second logical value, wherein the first logical value signifies data associated with the corresponding transfer unit is available in the volatile memory buffer for transfer to a host device and the second logical value signifies data associated with the corresponding transfer unit is not available in the volatile memory buffer for transfer to the host device.

8. The apparatus of claim 7, wherein the transfer unit manager is further configured, after issuing the read command to the processing circuit, to issue a status command to the processing circuit to obtain a status associated with the read command, wherein the processing circuit transfers the TUA bit map to the transfer unit manager responsive to the status command, and the transfer unit manager retrieves selected data from the volatile memory buffer responsive to the TUA bit map indicating the availability thereof.

9. The apparatus of claim 1, wherein the non-volatile memory is a flash memory array, each block of the plurality of blocks corresponds to a row of flash memory cells in a corresponding arrangement of erasure blocks, wherein the processing circuit comprises a memory module electronics (MME) circuit coupled to the flash memory array, and 1/N of the total number of the flash memory cells along each row are arranged into an associated transfer unit.

10. The apparatus of claim 9, further comprising a controller connected to the flash memory array and the MME module, the controller generating and transmitting the transfer unit bit map to the MME module during a read operation to transfer data to a host device, wherein the MME module subsequently updates a transfer unit available (TUA) bit map indicating the requested data are available in the local memory buffer for transfer to a second buffer associated with the controller.

11. An apparatus comprising:
    a flash memory module comprising an array of flash memory cells and a flash memory electronics (MME) module adapted to direct a transfer of data between the flash memory cells and a local MME buffer, the flash memory cells arranged into erasure blocks each comprising a plurality of rows, each row of flash memory cells in turn arranged into an integral plural number of N fixed-sized transfer units each having a common multi-bit size;
    a controller operationally coupled to the flash memory module and configured to issue commands thereto to direct a transfer of data between the local MME buffer to a host buffer, wherein the controller comprises programming stored in a memory adapted to:
       generate a transfer unit (TU) bit map as a sequence of N total bits with each bit in the N total bits corresponding to a different one of the N transfer units in a selected row of flash memory cells; and
       transmit the TU bit map to the MME module in conjunction with a read command to request transfer of the data stored in the associated transfer units identified by the TU bit map to the local MME buffer.

12. The apparatus of claim 11, wherein each bit in TU bit map has either a first logical bit value or a second logical bit value, wherein the first logical bit value signifies a request for a transfer of the data stored in the associated transfer unit to the local MME buffer, and the second logical bit value signifies that the data in the associated transfer unit has not been requested for transfer to the volatile memory buffer.

13. The apparatus of claim 11, wherein each of the N transfer units in the selected row comprises a user data payload and parity data configured to correct at least one read error in the user data payload during a read operation.

14. The apparatus of claim 11, wherein the MME module is configured to transfer the data stored in the transfer units identified by the TU bit map to the local MME buffer and to generate a transfer unit available (TUA) bit map comprising a plurality of entries for a corresponding plurality of rows in the non-volatile memory, wherein each of the entries comprises an N bit value, with each bit corresponding to a selected one of the transfer units of the associated row, each of the bits in the N bit value of each entry having either a first logical value or a second logical value, wherein the first logical value signifies data associated with the corresponding transfer unit is available in the local MME buffer, and the second logical value signifies data associated with the corresponding transfer unit is not available in the local MME buffer.

15. The apparatus of claim 14, wherein the MME module is further configured to transfer the TUA bit map to the controller responsive to a status request from the controller to the MME module associated with the read command, wherein the controller subsequently requests a transfer of data from the local MME buffer to the host buffer.

16. A method comprising:
  arranging a non-volatile memory into a plurality of blocks, each block having an integral plural number N multi-bit transfer units each having a common overall size;
  generating a transfer unit (TU) bit map comprising a multi-bit sequence of N total bits, stored in a memory, with each bit in the multi-bit sequence of N total bits representing a different one of the N transfer units of a selected block; and
  transferring data from at least a selected one of the transfer units of the selected block to a local buffer responsive to the TU bit map.

17. The method of claim 16, wherein each bit in the multi-bit sequence of N total bits in the TU bit map has either a first logical bit value or a second logical bit value, wherein the first logical bit value signifies a request for a transfer of the data stored in the associated transfer unit to the volatile memory buffer, and the second logical bit value signifies that the data in the associated transfer unit has not been requested for transfer to the volatile memory buffer.

18. The method of claim 16, wherein each of the N transfer units in the selected block comprise a user data payload and parity data configured to correct at least one read error in the user data payload during a read operation.

19. The method of claim 16, further comprising:
  generating a transfer unit available (TUA) bit map comprising a plurality of entries for a corresponding plurality of blocks in the non-volatile memory, the TUA bit map signifying the data transferred during the transferring step to the local buffer are available for retrieval by a controller.

20. The method of claim 19, further comprising issuing a status request associated with the read command, transmitting the TUA bit map responsive to the status request, and retrieving data from the local buffer responsive to the TUA bit map.

* * * * *